INVENTOR.
JAMES F. CAMPBELL
BY
ATTORNEY

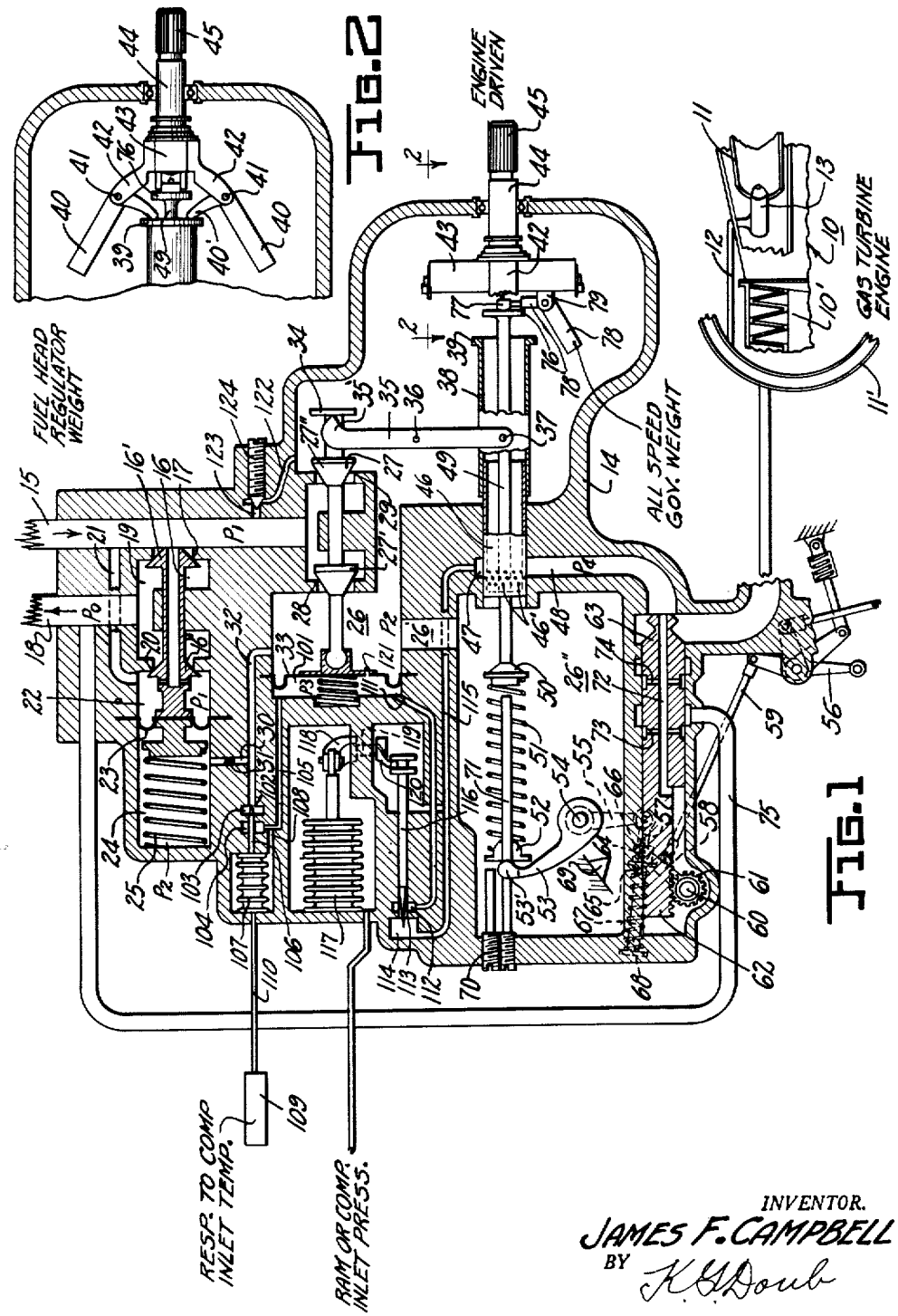

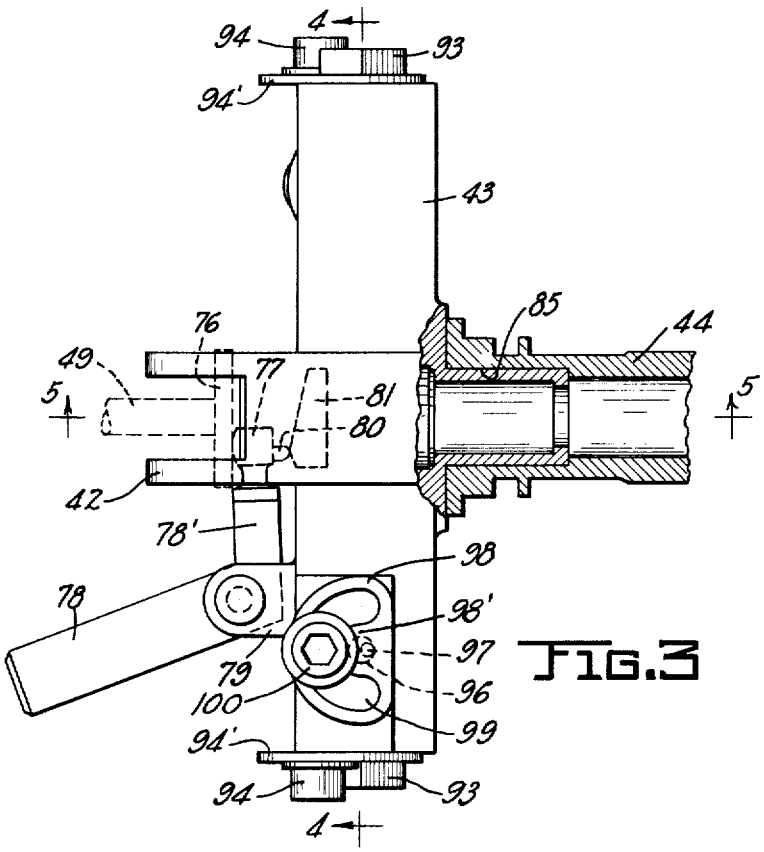
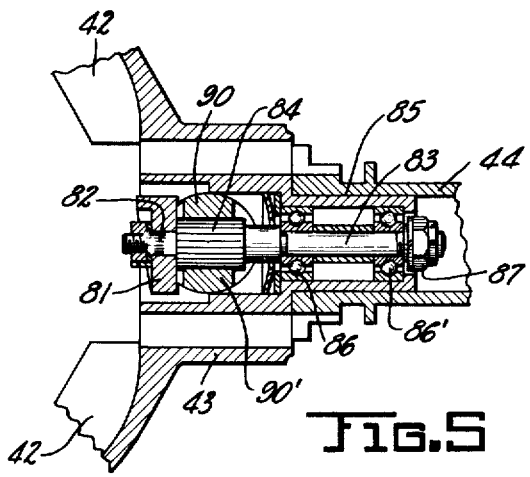

United States Patent Office 2,960,154
Patented Nov. 15, 1960

2,960,154
FUEL CONTROL DEVICE UTILIZING ENGINE SPEED GOVERNOR

James F. Campbell, South Bend, Ind., assignor to The Bendix Corporation, a corporation of Delaware Filed Dec. 8, 1951, Ser. No. 260,664

10 Claims. (Cl. 158—36)

This invention relates to a fuel control device for engines particularly for gas turbine engines of the type commonly used in aircraft. The ultimate aim in a control for such engines is to enable a pilot or operator to accelerate or decelerate to selected speeds or loads at will with maximum engine efficiency and without producing dangerously high temperatures in the burner system and/or compressor surge upon acceleration, or burner failure or die-out upon deceleration. Ordinarily, the flow of air to the burners of a gas turbine engine driving a compressor is a substantial linear function of engine speed and the rate of fuel feed may, therefore, be a function of, or proportional to, engine speed subject to correction for changes in entering air density. A fuel feed and power control device which effectively operates to maintain the rate of fuel feed within predetermined limits as a function of engine speed and entering air pressure and temperature is disclosed in Patents Nos. 2,581,275 and 2,581,276, issued to Frank C. Mock and assigned to the assignee of the present application. In engines having certain characteristics, however, particularly those utilizing axial flow compressors, there is a tendency to surge and even stall at certain speeds, and it then becomes necessary to so regulate the rate of fuel feed as to avoid the surge region, which usually occurs in the midspeed range of the engine during acceleration. It has been established that surge is a function of engine speed and entering air pressure and temperature. Thus, in order to accelerate rapidly within an upper temperature limit and yet avoid surge, it becomes necessary to modify the rate of fuel feed at some midspeed point during acceleration. A device which coacts with the all-speed fuel governor of a gas turbine engine to modify the rate of fuel feed in a manner such as to avoid surge is disclosed in the copending application of Vincent P. Gibney, Serial No. 221,679, filed April 18, 1951 (common assignee) now Patent No. 2,823,738. The present invention relates to a control device of the Gibney type, but embodies certain novel means to describe, whereby a desired acceleration curve plotting fuel flow against engine speed may be more readily obtained.

The foregoing and other objects and advantages will become apparent in view of the following description taken in conjunction with the drawings, wherein:

Figure 1 is a sectional schematic view, with certain parts broken away, of a fuel control device in accordance with the invention;

Figure 2 is a section taken on the line 2—2, Figure 1;

Figure 3 is an enlarged view in section and elevation of the so-called governor head, which carries the governor valve control cam and weight mechanism;

Figure 4:
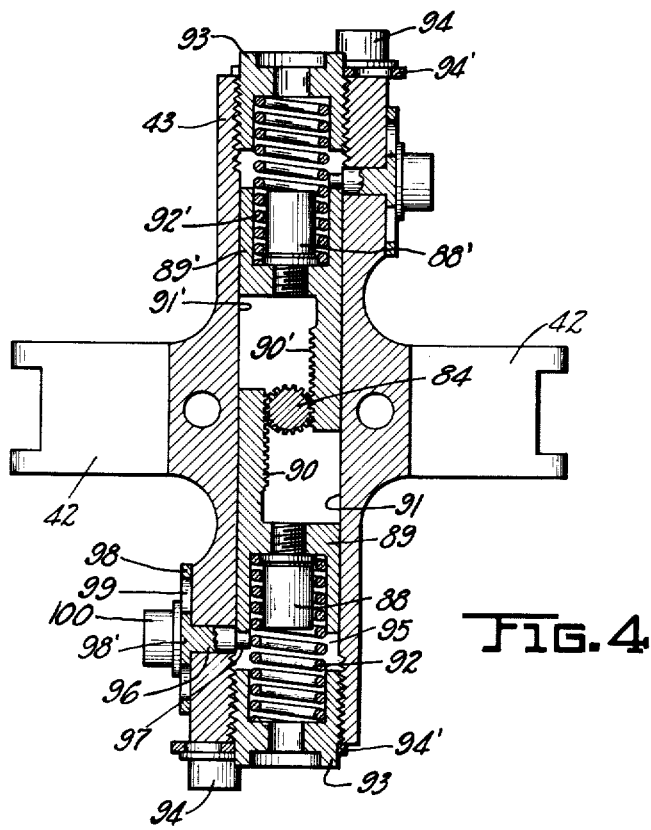
Figure 6:
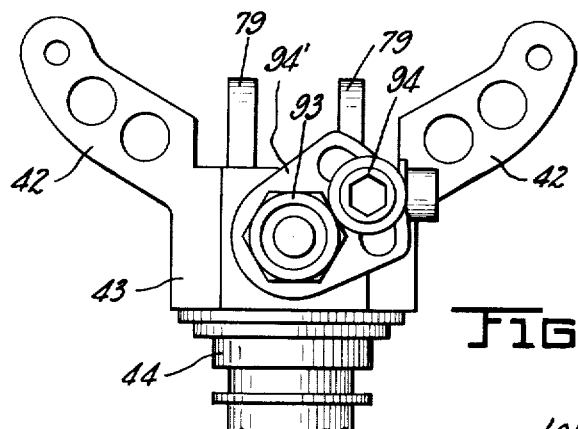
Figure 7:
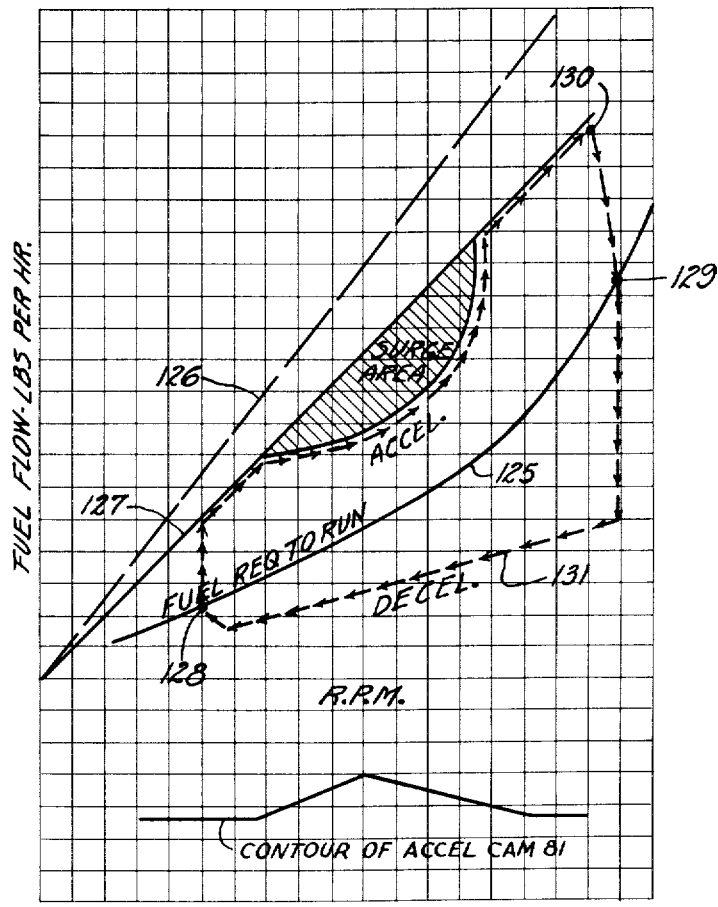

Figures 4 and 5 are sections taken, respectively, on the lines 4—4 and 5—5, Figure 3;

Figure 6 is an elevation of the governor head as viewed from the top of Figure 4; and Figure 7 is a curve chart illustrating the operation of the control.

In Figure 1, a gas turbine engine is generally indicated at 10; it has a combustion chamber or chambers 11 which are supplied with air by means of a compressor 10', and with liquid fuel from a control device, to be described, by way of a fuel manifold 11', individual fuel lines 12 and burner nozzles or atomizers 13 (only one combustion chamber, nozzle and fuel or feed line being shown). The fuel is ignited upon discharge, and the expanded air and products of combustion are directed through a turbine, not shown, which drives the compressor, the remaining unexpended energy being used either for jet thrust or for driving a propeller or for both, depending upon the particular type of aircraft engine involved.

The fuel control proper comprises a main body or casting 14, formed with an inlet conduit 15, to which fuel is supplied under ($P_1$) pressure from a suitable source such as a fuel tank, not shown, by means of a pump, also not shown, which in the present instance is assumed to be of the by-pass type, the delivery system including a by-pass valve 16, having a valve member 16' controlling a port 17, which communicates passage 15 with return conduit 18 by way of a chamber 19, the passage 18 leading back to the low pressure ($P_0$) side of the pump. The valve 16 is of the balanced type, having a companion valve member 16" controlling a port 20, whch also communicates inlet passage 15 with return passage 18 by way of a passage 21, chamber 22 and chamber 19. Chamber 22 is also vented to $P_1$ pressure through the hollow interior of valve 16. Since the exposed portions of valve members 16' and 16" are of substantially the same effective area and are subjected to the same pressure, they will balance one another and the valve will respond solely to the differential across diaphragm 23, which is the resultant of $P_1$ pressure in chamber 22, minus $P_2$ or unmetered fuel pressure in chamber 24 plus the force exerted by spring 25. This so-called unmetered fuel pressure is that of the fuel in regulator chamber 26, to which fuel flows from inlet passage 15 across a regulator valve 27, said latter valve being also of the balanced type, having companion valve members 27' and 27" controlling ports 28 and 29, which communicate inlet passage 15 with regulator chamber 26. Chamber 24 is vented to chamber 26 by way of passage 30, having a calibrated diaphragm damping jet or restriction 31 therein, and passage 32. It will be seen that since chamber 24 is vented to unmetered or $P_2$ pressure, the supply or $P_1$ pressure will always be maintained at a predetermined value above $P_2$ pressure as determined by the force of spring 25, which represents a constant.

The regulator valve 27 is responsive to the differential across diaphragm 33, which is a function of engine speed. The outer or right hand end of the valve 27 is provided with a boss or collar 34, which is engaged by the forked end 35' of a lever 35, fulcrumed at 36 and having its opposite end pivotally connected at 37 to a sliding sleeve 38. The right hand end of sleeve 38 is formed with an annular flange or boss 39, which is engaged by the inner end or foot 40' of a pair of centrifugal speed-sensing weights 40, see Figure 2, pivoted at 41 to brackets 42, which are shown as formed integral with a rotatable supporting and housing member herein termed a governor head 43, secured on the one end of and rotatable with a hollow shaft 44, provided at its opposite end with a driving spline or pinion 45, by means of which it may be driven in relation to engine speed. This governor head is so fabricated as to house the centrifugal weight and cam mechanism constituting an essential part of the present invention and which will subsequently be described.

A throttle or governor valve is indicated at 46; it is in the form of a hollow sleeve formed with a plurality of feed restrictions or orifices 46', which are calibrated to obtain a predetermined flow area for a given position of the valve with respect to annular port or chamber 47, which opens into metered fuel ($P_4$ pressure) passage 48. The sleeve 46 is secured to and moves with a rod 49, which at its left hand end is formed with a boss 50, engaged by the one end of a governor spring 51, the opposite end of said spring being provided with a slidable abutment 52, engaged by the forked end 53' of a lever 53, secured on a shaft 54. Also secured on the same shaft is an arm or lever 55, which is operatively connected to a pilot's control lever 56 (or a lever adapted for connection to a pilot's control lever) through a link 57, arm 58 and link rod 59. Arm 58 is secured on a shaft 60, mounting a pinion 61, having its teeth in mesh with those formed on the rack section 62 of a cut-off valve 63. The upper or outer end of arm 58 is connected to link 57 by means of a pin or short shaft 64, projecting through an elongated slot 65, formed in a short sleeve 66, slidable on a swinging link rod 67 against the resistance of a spring 68, the said rod 67 being also formed with a slot complementary to slot 65. A stop 69 limits movement of lever or arm 55 in a direction tending to increase the setting of the governor valve 46 and hence the approximate maximum engine speed, while an adjustable screw 70 determines the minimum idle setting of the said valve. The reason for the lost motion connection between arm 58 and arm or lever 55, is to permit further rotation of the pilot's lever 56 after arm 55 contacts stop 69, so that if the said lever 56 is used to control other devices, such as an exhaust jet area valve, its controlling action will not be too restricted.

A rod 71 provides a guide for the slidable boss 52 and it also serves as an adjusting screw for determining the minimum flow position of the governor valve 46.

The cut-off valve 63 is formed with a central passage 72 and cross ducts 73 and 74 for venting $P_4$ pressure to the low pressure side of the pump by way of conduit 75 when the said valve is closed.

The primary feature of the present invention is the surge control cam and centrifugal weight actuating mechanism therefor (shown much enlarged in Figures 3, 4 and 5) carried by the governor head 43 for automatically regulating the effective flow area of the governor or throttle valve 46 during a transient condition following resetting of the all-speed governor by the pilot when accelerating from some low or idle speed, for example, to a maximum or near maximum engine speed.

The right hand end of the valve rod or shaft 49 is provided with an annular bearing abutment or like member 76, the outer bearing face of which is engaged by a shoe 77, formed on the lever arm portion 78' of a governor weight 78, pivotally mounted on a bracket 79, formed on the governor head 43. Although only one governor weight 78 is used in the present instance, as many as desired and found necessary may be utilized. Projecting in a direction opposite the bearing surface of the shoe 77 is a cam follower 80, adapted to engage the active surface of a cam 81, compare Figures 3 and 5. The effective surface contour of this cam is preferably such as will produce a performance curve as shown in Figure 7. This cam is formed with a serrated axial opening by means of which it may be adjustably fixed on the serrated end 82 of a short cam shaft 83, provided with a pinion 84. The shaft 83 and its bearing assembly are adapted for insertion in a hollow projection 85, formed on the one side of the governor head 83 and telescoped into adjacent hollow end of the shaft 44. In the example shown, there are a pair of bearings 86, 86' and an intermediate spacer secured in assembled relation by end nut 87, with the bearing 86 abutting a shoulder formed on said shaft.

The cam shaft 83 and cam 81 are rotated by means of a pair of centrifugal speed-sensing weights 88 and 88', Figure 4, which are carried by a pair of hollow slidable rack pistons 89 and 89', provided with toothed rack bars 90 and 90'. The pistons 89 and 89' are mounted to slide in oppositely projecting hollow cylinders 91 and 91', formed in the governor head 43. Springs 92 and 92' normally urge the pistons 89, 89' inwardly toward a retracted position. The rack bars 90 and 90' have their teeth in mesh with those of the pinion 84.

A retainer nut 93 is adjustably threaded into the outer end of each cylinder 91, 91' and is fixed in adjusted position by a lock nut 94 and coacting lock washer 94', the latter being formed with an arcuate slot for the nut 94 to provide a vernier adjustment within a complete turn of the washer. To adjustably limit the radial travel of each piston 89, 89' and hence the degree of rotation of cam 81, a rotatable stub shaft or pin 96 (compare Figures 3 and 4) projects through each governor head and terminates at its inner end in an eccentric stop 97, rotatable through a space 95 between the inner end of each screw 93 and the outer edge of each piston. The stub shaft 96 at its outer end is formed integral with the central portion 98' of a bracket 98, which has an arcuate slot 99, through which a clamping or set screw 100 projects and is threaded into the adjacent wall of the governor head. To adjust the stop 97, screw 100 is loosened and the bracket 98 rotated to in turn rotate the eccentric in the space 95 to the desired position, whereupon screw 100 is tightened to clamp the bracket in place.

The limit of radial inward travel of the rack pistons 89, 89' is determined by the distance between the inner end of each rack 90, 90' and the base of the oppositely disposed piston, note Figure 4. When these contact, the cam 81 will have been rotated to its return position, viz. the position it assumes at low or idling engine speed.

In the position of the governor valve 46 and coacting parts as shown in Figure 1, it may be assumed that the rate of fuel feed is such as to produce a low or idling engine speed. Should the governor spring now be compressed by rotating lever 53 clockwise, the governor valve will open, but only to a point where the follower 80 will be brought up against the effective surface of cam 81. From this point until a speed is attained where the centrifugal force exerted by the weight 78 is sufficient to overcome the governor spring and move the follower 80 clear of cam 81, the latter dictates the rate of fuel feed since it determines the effective position of the governor valve. The rate of travel or rotation of the cam 81 may be coordinated with the action of the governor spring 51 and governor weight 78 by suitably preloading or adjusting the springs 92, 92'. The operation of the governor in general will be more fully hereinafter explained in conjunction with the curve chart of Figure 7.

Density compensating circuit: the basic principles of this circuit are illustrated, described and claimed in the copending application of Frank C. Mock, Serial No. 620,755, filed November 6, 1945 (common assignee), now Patent No. 2,644,513.

The diaphragm 33 forms a movable wall between chamber 26 ($P_2$ pressure) and a chamber 101 ($P_3$ or so-called compensating pressure). Chamber 26 communicates with chamber 101 by way of passage 32, variable orifice 102, chambers 103, 104 and passage 105. The effective area of orifice 102 is controlled by a needle valve 106, connected to the free end of a bellows 107, which is vented to liquid fuel by way of a passage 108. Venting could also be had by providing clearance around the needle 106. A temperature sensing bulb is indicated at 109; it is connected to the bellows 107 by means of a capillary tube 110. Bulb 109, tube 110 and bellows 107 are filled with an incompressible temperature responsive liquid, such as normal butyl alcohol. The interior of bellows 107 is so constructed as to cancel out the effects of changes in temperature of the fuel on the bellows, such construction forming the subject matter of application Serial No. 222,001 filed in the name of George M. Widell (common assignee) April 18, 1951, now Patent No. 2,736,501.

The bulb 109 is so located as to respond to changes in compressor air inlet temperature, preferably the temperature of the air in the area of the third stage of an axial flow compressor where such type of compressor is involved, an increase in temperature causing needle 106 to restrict or reduce the area of orifice 102 and a decrease in temperature having the opposite effect. There is sufficient clearance between the needle and that portion of the passage between chambers 103 and 104 as to permit fuel to flow past the needle.

Chamber 101 communicates with the metered fuel discharge passage 48 ($P_4$ pressure) by way of passage 111, chamber 112, variable orifice 113, chamber 114, passage 115, and chamber 47. The orifice 113 is controlled by a needle valve 116, which is connected to the movable end of a pressure responsive bellows 117 by means of arm 118, shaft 119, and arm 120. Bellows 117 may be subjected to compressor air inlet pressure in the area of the third stage of the axial flow compressor 10'. It will be understood, however, that either one or both the bulb 109 and bellows 117 may be adapted to respond to selected temperatures and pressures other than compressor inlet temperature and ram or compressor inlet pressure.

Preferably, but not necessarily, the diaphragm 33 is provided with one or more jets 121, which provide a minimum or basic flow from chamber 26 to chamber 101 in the event the temperature needle 106 becomes stuck in the orifice 102. Normally, the temperature needle 106 never completely closes the orifice 102, but simply varies the effective area thereof.

It will be seen that passages 26', chamber 26", interior of throttle valve sleeve 46, and the ports 46' (the main flow circuit) constitute one flow passage from regulator chamber 26 to port or chamber 47, and that passage 32, orifice 102, chambers 103, 104, passage 105, chamber 101, passage 111, chamber 112, variable orifice 113, chamber 114, and passage 115 constitute another flow passage (the density circuit) in parallel with first named flow passage; and since the pressures at opposite ends of said passages are equal, the pressure drop across the respective passages will be equal at a given engine speed and entering air pressure and/or temperature. The fuel pressure differential across the regulator diaphragm 33 is the result of the action of the centrifugal head generating weights 40, and this differential, applied to the effective diaphragm area, provides a force which is always equal to and balances the force set up by said weights. Hence the fuel pressure differential across the diaphragm 33 and the density control circuit flow will vary with engine speed. All flow through the density circuit must pass through the pressure orifice 113 which is in series with the diaphragm jets 121. Should there be a change in the position of the temperature needle 106 or the pressure needle 116, the effective areas of the orifices 102 and/or 113 will be varied and this will momentarily vary the $P_2-P_3$ differential across the diaphragm 33, or upset the force balance of the regulator, whereupon the regulator valve 27 will move towards open or closed position and the rate of fuel feed will either increase or decrease to a point where the fuel pressure differential $P_2-P_3$ is again in balance with the force produced by the centrifugal weight or weights 40. Thus, the density circuit constitutes a bleed off the main flow circuit and senses the pressure differential across the governor valve 46 in order to correct the position of the regulator valve 27 for variations in pressure and/or temperature of the air flowing to the engine. Also, at any given engine speed as determined by the setting of the governor or pilot's control lever, the position of the governor valve 46 will remain substantially constant irrespective of changes in entering air pressure and/or temperature, but fuel flow will still vary in relation to such changes due to a variation in the fuel metering head. Should the governor valve 46 open or close to maintain a selected engine speed, the regulator valve 27 will open or close to maintain the fuel pressure differential across the governor valve for that particular speed.

It is sometimes desirable to have a minimum or predetermined amount of uncompensated flow of metered fuel to the engine to avoid possible power failure when the pilot throttles back at high altitude, and to avoid lag during subsequent acceleration. This is accomplished in the present instance by a passage 122 communicating the inlet passage 15 with the $P_2$ pressure chamber 26, said passage being provided with an orifice 123, the effective area of which is adjustable by means of a valve 124. This passage 122 by-passes the regulator valve 27, so that irrespective of the position of the said latter valve at altitude, there will always be a minimum supply of fuel or $P_2$ pressure to the throttle valve 46.

*Operation*

In starting a gas turbine engine, suitable cranking means is provided to bring the engine up to a point where it attains a self-sustaining speed. In the position of the parts as schematically illustrated in Figure 1, it may be assumed that the engine is operating at idle speed under normal ground level air pressure and temperature conditions. Fuel flows to the regulator valve 27 by way of conduit 15 at $P_1$ pressure as determined by the setting of the by-pass valve spring 25, then across the regulator valve to chamber 26, passage 26' and chamber 26", into the hollow governor valve 46 and thence through the metering orifices 46' to passage 48, fuel manifold 11 and fuel lines 12 to the burner nozzles 13. A limited quantity of fuel will also flow through the density control circuit to the metered fuel passage 48 in the manner heretofore described, this flow (compensating pressure $P_3$) by-passing the throttle valve 46.

The governor or throttle valve 46 is the prime control of fuel to the engine. For every power lever position, there is a definite force set up by the governor spring 51 tending to open the governor or throttle valve, and for every engine speed there is a definite thrust force set up by the governor weight 78 tending to close the said valve. When the pilot resets his throttle lever to select an operating speed, the valve 46 will automatically seek a position of equilibrium as the selected speed is attained, whereupon the thrust force from the governor weight 78 will equal the force of the spring 51, and fuel will be metered at a rate tending to maintain the engine speed constant.

Movement of the throttle or governor valve 46 in a direction causing an increase in the area of the metering restrictions 46' results in a momentary decrease in the drop across said valve and a corresponding decrease in $P_2$ pressure in chamber 26, whereupon the regulator valve 27 moves towards open position and fuel flow across the regulator valve quickly increases to a point where the fuel head across the regulator diaphragm is in balance with the centrifugal weights 40. Then, as the engine speed increases, the head across the increased throttle valve area increases, thus increasing fuel flow with engine speed, until the force exerted by the governor weight 78 starts to balance the load on governor spring 51, whereupon the governor valve 46 moves in a closing direction to an equilibrium position. Movement of the throttle valve in a direction to restrict the flow of fuel results in an increase in throttle valve drop and a corresponding increase in $P_2$ pressure in chamber 26, whereupon the regulator valve moves towards closed position and fuel flow across the regulator valve quickly decreases to a point where the fuel head is again in balance with the speed sensing weights 40. Thereupon, the fuel head and hence fuel flow to the engine decreases with engine speed until the governor again attains an equilibrium condition at a lower speed setting.

The metering head or differential across the governor or throttle valve 46 and hence the rate of fuel feed will also increase and decrease with changes in the pressure and/or temperature of the air flowing to the engine in the manner heretofore described.

Referring to Figure 7, the curve chart plots fuel flow against engine speed, conditions being assumed to be at normal ground level pressure and temperature. The curve 125 represents the fuel feed required to run at various steady engine speeds, or a rate of feed required to run the engine at given settings of the all-speed governor valve 46. The dashed line 126 represents the upper pumping limit of the fuel supply pump. The line at 127 represents maximum temperature fuel flows, or a temperature which may be maintained with safety for short periods of time only during acceleration. The shaded area denotes an upper limit on the rate of fuel feed which must be observed to avoid compressor surge or stall during acceleration; it occurs in the mid-speed range and may vary in depth and location with respect to line 127 in engines having different characteristics and as a function of entering air pressure and temperature and engine speed. Below the r.p.m. line or abscissa is a diagram representing the effective surface of a portion of the cam 81.

If it be assumed that the engine is operating at point 128 and the pilot resets his control lever and hence the governor spring 51 sufficiently to accelerate to point 129, then the fuel supplied during this period of acceleration will follow the arrows from 128 to 129. The initial increase in flow represented by the vertical arrows occurs as a result of the sudden increases in effective area of the metering orifices 46' at the then existing speed.

In the position of the parts shown in Figures 1 and 2, the engine is assumed to be operating at a steady speed, for example at point 128, at which time the follower 80 will be clear of the effective surface of the cam 81, since the centrifugal action of the weight 78 will exert sufficient force in opposition to that exerted by the spring 51 to hold the parts in the position shown. When the pilot resets his control lever and compresses the spring 51 to accelerate, the initial force exerted by the spring 51 moves the contact member 76 against the shoe 77 and hence the follower 80 against the effective surface of the cam 81. Since there has been an increase in the rate of fuel feed as represented by the vertical arrows from 128 to the line 127, the engine speed will increase; but this increase in speed is not yet sufficient to cause the weight 78 to overcome the force of the governor spring 51. Hence the follower 80, being held in contact with the surface of the cam 81, will follow the contour of said cam and the rate of rotation of the latter, due to the centrifugal force exerted by the weights 88, 88' and pistons 89, 89', will determine the effective position of the governor valve 46. Assuming the force of springs 92, 92' to represent a constant, then the cam 81 will rotate as a function of engine speed. The effective surface of the cam 81 may be so contoured as to produce a rate of fuel feed approximately as indicated by the arrows which parallel the maximum temperature line 127 and then dip to by-pass the surge area, and then again parallel line 127 until point 130 is reached, at which point governor cut-off begins, whereupon the rate of fuel feed decreases to point 129. The springs 92 may be preloaded to determine the point at which cam 81 begins to rotate.

Should the pilot suddenly throttle back to the idle range, or from point 129 to point 128, the rate of fuel feed will approximate the arrows along the line indicated at 131. Since during deceleration, follower 80 is out of contact with cam 81, the deceleration rate of fuel feed is not affected by the contour of said cam. This is quite an advantage due to the fact that a desired acceleration curve may be selected independently of, or without affecting the deceleration characteristics of an engine.

From the foregoing, it will be seen that the pilot may reset his control lever to accelerate from the low to a high or maximum power position at will, following which or during a transient condition, the rate of fuel feed will automatically follow a predetermined pattern as determined by the effective contour of cam 81.

Although only one embodiment of the invention has been illustrated and described, various changes in the form and relative arrangement of parts may be made to suit requirements.

I claim:

1. In a fuel feeding system for an engine, a fuel supply conduit having a restriction therein, a valve for varying the effective area of said restriction, a governor operatively connected to said valve including a governor spring and one or more governor weights coacting with said spring to maintain a speed, a rotatable cam coacting with said spring for controlling the area of said valve during acceleration of the engine said governor having a hollowed rotatable head providing a pair of oppositely-disposed cylinders, a pair of spring-pressed weighted pistons slidably mounted in said cylinders, a cam shaft rotatably mounted in said head and provided with a pinion, said pistons having radially-inwardly projecting rack gears engaging said pinion to effect rotation of said cam, said governor weight or weights each having a foot or lever portion adapted to effect movement of said valve in opposition to said spring, and a cam follower carried by said foot or lever portion and adapted to engage the effective surface of said cam.

2. In a fuel feeding system for an engine, a fuel supply conduit having a restriction therein, a valve for varying the area of said restriction, governor means connected to said valve including at least one rotatable centrifugal weight, means operatively connected to said valve and rotatable with said centrifugal weight for controlling the position of said valve during an acceleration of the engine, and means connected to said last mentioned means for rotating said last mentioned means relative to said centrifugal weight during an acceleration of the engine.

3. In a fuel feeding system for an engine, a fuel supply conduit having a restriction therein, a valve for varying the area of said restriction, governor means connected to said valve including at least one rotatable centrifugal weight and a variably preloadable member for selecting an engine operational speed, cam means operatively connected to said valve and rotatable with said centrifugal weight for controlling the position of said valve during an acceleration of the engine, and a rotatable means connected to said cam means for rotating said cam means relative to said centrifugal weight during an acceleration of the engine.

4. A governor mechanism comprising a fluid flow control valve, means for limiting the minimum fluid flow position of said valve, and rotatable means for variably limiting the maximum fluid flow position of said valve including a centrifugal weight operatively connected to said valve, a cam normally rotatable with said weight and means for causing under certain conditions of governor operation a rotational movement of said cam which is relative to the rotational movement of said centrifugal weight.

5. A governor mechanism comprising a fluid flow control valve, means for limiting the minimum fluid flow position of said valve, and rotatable means for variably limiting the maximum fluid flow position of said valve during a change in the rate of rotation of said rotatable means including a centrifugal weight operatively connected to said valve for controlling said maximum flow position thereof, first means connected to said weight and rotatable therewith without relative rotation with respect thereto and second means rotatable with said weight for causing relative rotation between said first means and said weight only during a change in the rate of rotation of said first mentioned rotatable means.

6. In a fuel feeding system for an engine including a combustion chamber, said system including a fuel source, a fuel supply conduit having a restriction therein and being connected between said source and the combustion chamber, a valve for varying the effective area of said restriction, an all-speed governor operatively connected to said valve including a first centrifugal weight and a governor spring, control means for preloading said spring to select an engine operational speed, a rotatable cam member coacting with said spring to guide said valve independently of governor action during part of a transition in speed following resetting of said governor to accelerate the engine, engine driven means operatively connected to said first centrifugal weight and said rotatable cam member whereby said first centrifugal weight and said rotatable cam member are caused to rotate in unison in accordance with engine speed, and a second centrifugal weight member for effecting rotation of said cam member relative to said first centrifugal weight as a function of engine speed.

7. In a fuel feeding system for an engine including a combustion chamber, said system including a fuel source, a fuel supply conduit having a restriction therein and being connected between the fuel source and the combustion chamber, a valve for varying the effective area of said restriction, an all-speed governor operatively connected to said valve and including a governor spring and at least one governor weight member coacting with said spring to maintain a selected speed, a rotatable cam member in direct coacting relation with said spring to guide said valve independently of governor weight action during part of a transition in speed following resetting of the governor to accelerate the engine, engine driven means operatively connected to said governor weight and said rotatable cam whereby said governor weight and said rotatable cam are caused to rotate in unison in accordance with engine speed, and at least one centrifugal weight member for effecting rotation of said cam member relative to said governor weight as a function of engine speed.

8. A fuel feeding system as claimed in claim 7, wherein said governor includes a governor head provided with cylinders slidably receiving said centrifugal weight member, said cam being secured on a shaft provided with a pinion and said weights being provided with rack gears arranged to engage said pinion and effect rotation of said cam.

9. In a fuel control system for an engine including a fuel combustion chamber, said system including a source of fuel, a fuel conduit including a fuel valve connected between the source of fuel and the fuel combustion chamber, said fuel valve including a movable valve control member, a first member connected to said valve control member, said first member having an axis and being reciprocable along said axis, rotatable control means connected to said first member for variably limiting the extent of axial movement of said first member in one direction and including a first rotatable element adapted to abut said first member, a second element rotatable with said first element, said first and second rotatable elements being rotated in unison, and a device rotatable with said first element and said second element for superimposing on the second element a rotational movement which is relative to the rotational movement of the first element when the rate of rotation of the rotatable means is varied.

10. In a fuel control apparatus for an engine including a fuel combustion chamber, a fuel conduit including a fuel valve connected to control the supply of fuel to the combustion chamber, a movable control member connected to said valve for controlling the operation of the valve, rotatable control means operatively connected to said control member for controlling the movement of the control member, said control means including a rotatable first element, a contoured second element rotatable with said first element, means responsive to an engine operating condition which varies with engine power output operatively connected to said first and second elements for rotating said first and second elements in unison as a function of said engine operating condition, and a control device operatively connected to the second element for rotating the second element relative to the first element under a predetermined condition of operation of said engine.

References Cited in the file of this patent

UNITED STATES PATENTS

| | | |
|---|---|---|
| 1,973,443 | Preisig | Sept. 11, 1934 |
| 2,179,696 | Keel et al. | Nov. 14, 1939 |
| 2,324,516 | Kalin | July 20, 1943 |
| 2,364,116 | Whitehead | Dec. 5, 1944 |
| 2,410,474 | Zeigler | Nov. 5, 1946 |
| 2,489,586 | Ray | Nov. 29, 1949 |
| 2,557,526 | Bobier et al. | June 19, 1951 |
| 2,628,472 | Dray et al. | Feb. 17, 1953 |
| 2,638,742 | Carey | May 19, 1953 |
| 2,643,514 | Jubb | June 30, 1953 |
| 2,664,152 | Davies et al. | Dec. 29, 1953 |
| 2,694,459 | Biermann | Nov. 16, 1954 |
| 2,720,751 | Kunz, Jr. | Oct. 18, 1955 |
| 2,779,422 | Dolza et al. | Jan. 29, 1957 |

FOREIGN PATENTS

| | | |
|---|---|---|
| 634,095 | Great Britain | Mar. 15, 1950 |
| 113,845 | Great Britain | Mar. 11, 1918 |